United States Patent
Taylor et al.

(10) Patent No.: US 12,307,758 B2
(45) Date of Patent: May 20, 2025

(54) DEEP LEARNING BASED DISTRIBUTED MACHINE VISION CAMERA SYSTEM

(71) Applicant: Intel Corporation, Santa Clara, CA (US)

(72) Inventors: Stewart Taylor, Los Altos, CA (US); Jingjing Fan, Shenzhen (CN); Wanglei Shen, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 530 days.

(21) Appl. No.: 17/626,774

(22) PCT Filed: Sep. 6, 2019

(86) PCT No.: PCT/CN2019/104685
§ 371 (c)(1),
(2) Date: Jan. 12, 2022

(87) PCT Pub. No.: WO2021/042367
PCT Pub. Date: Mar. 11, 2021

(65) Prior Publication Data
US 2022/0358754 A1     Nov. 10, 2022

(51) Int. Cl.
*G06V 10/98*     (2022.01)
*G06V 10/44*     (2022.01)
(Continued)

(52) U.S. Cl.
CPC ............ *G06V 10/98* (2022.01); *G06V 10/454* (2022.01); *G06V 10/82* (2022.01); *G06V 20/52* (2022.01); *H04N 7/181* (2013.01)

(58) Field of Classification Search
CPC ...... G06V 10/98; G06V 20/52; G06V 10/454; G06V 10/82; H04N 7/181
(Continued)

(56) References Cited

U.S. PATENT DOCUMENTS 8,126,833 B2 * 2/2012 Cobb ..................... G06V 20/52
706/46
10,074,038 B2 * 9/2018 Hsieh .................. G06F 18/2193
(Continued)

FOREIGN PATENT DOCUMENTS

CN     107392896     11/2017
CN     107945152     4/2018
(Continued)

OTHER PUBLICATIONS

International Search Report and Written Opinion for International Patent Application No. PCT/CN2019/104685, mailed May 26, 2020.
(Continued)

*Primary Examiner* — William D Titcomb
(74) *Attorney, Agent, or Firm* — Hanley, Flight & Zimmerman, LLC

(57) ABSTRACT

Devices and techniques related to implementing a distributed machine vision camera system are discussed. The distributed machine vision camera system includes distributed cameras that attain raw image data and directly apply deep learning engines to the raw image data to perform machine vision, such that the distributed cameras do not have the capability to convert the raw image data to viewable image data, and a centralized device to receive the raw image data when a positive machine vision indicator is detected and convert the raw image data to viewable image data for inspection by a user.

11 Claims, 8 Drawing Sheets

(51) Int. Cl.
*G06V 10/82* (2022.01)
*G06V 20/52* (2022.01)
*H04N 7/18* (2006.01)

(58) Field of Classification Search
USPC .......................................................... 382/156
See application file for complete search history.

(56) References Cited

U.S. PATENT DOCUMENTS

| | | | |
|---|---|---|---|
| 10,474,988 B2* | 11/2019 | Fisher | G06V 10/82 |
| 11,798,064 B1* | 10/2023 | Rodriguez | G06N 3/09 |
| 2009/0268950 A1 | 10/2009 | Kuo | |
| 2010/0061624 A1* | 3/2010 | Cobb | G06F 18/22 |
| | | | 382/157 |
| 2013/0229511 A1* | 9/2013 | Oostendorp | H04N 7/181 |
| | | | 348/92 |
| 2013/0235186 A1* | 9/2013 | Chen | G01N 21/9515 |
| | | | 348/126 |
| 2018/0196587 A1* | 7/2018 | Bialynicka-Birula | |
| | | | G06V 20/41 |
| 2018/0367752 A1* | 12/2018 | Donsbach | G06F 18/22 |
| 2019/0043003 A1* | 2/2019 | Fisher | G06V 10/82 |
| 2019/0089932 A1* | 3/2019 | Oostendorp | H04N 7/181 |
| 2019/0130208 A1* | 5/2019 | Michael | G06V 20/00 |
| 2019/0130217 A1* | 5/2019 | Wu | G06T 5/20 |
| 2021/0056349 A1* | 2/2021 | Knaan | G06T 7/593 |
| 2022/0086399 A1* | 3/2022 | Oostendorp | H04N 7/181 |
| 2022/0358754 A1* | 11/2022 | Taylor | G06V 10/98 |
| 2023/0032920 A1* | 2/2023 | Bulzacki | A63F 3/00157 |

FOREIGN PATENT DOCUMENTS

| | | |
|---|---|---|
| CN | 109738455 | 5/2019 |
| CN | 110148106 | 8/2019 |

OTHER PUBLICATIONS

International Preliminary Report on Patentability for PCT Application No. PCT/CN2019/104685, dated Mar. 17, 2022.

* cited by examiner

DEEP LEARNING BASED DISTRIBUTED MACHINE VISION CAMERA SYSTEM

CLAIM OF PRIORITY

This Application is a National Stage Entry of, and claims priority to, PCT Application No. PCT/CN2019/104685, filed on 6 Sep. 2019 and titled "DEEP LEARNING BASED DISTRIBUTED MACHINE VISION CAMERA SYSTEM", which is incorporated by reference in its entirety for all purposes.

BACKGROUND

Machine vision camera systems may be implemented to provide imaging-based automatic inspection, analysis, etc. in a variety of contexts, typically in industrial applications. For example, many production lines may be provided in a given factory and multiple machine vision cameras may be implemented on each production line for automatic inspection, defect detection, quality monitoring, and other tasks.

Such systems are typically costly as many cameras are implemented and interconnected in a production environment. Furthermore, the image capture, image processing, data storage, and so on are complex and require large amounts of computational and bandwidth resources. Such image processing includes pre-processing images for display to a human, applying deep learning to such pre-processed images for automatic inspection, and other tasks. In some implementations, each camera in the system provides such image pre-processing (e.g., defect pixel correction, lens shading correction, spatial denoising, gamma correction, YUV conversion, edge enhancement, and temporal denoising) in an image processing pipeline having a raw image input and a displayable image format (e.g., YUV) output. For example, the image processing pipeline may be implemented via a dedicated image signal processor. Such YUV or other image format output may then be displayed to a human (e.g., at the camera or at a central location) and used as an input for deep learning applications for automated processing (e.g., at the camera or at a central location).

However, such implementations are costly and complex particularly in large scale implementations. It is with respect to these and other considerations that the present improvements have been needed. Such improvements may become critical as the desire to provide machine vision camera systems in a variety of contexts becomes more widespread.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures.

DETAILED DESCRIPTION

Figure 1:
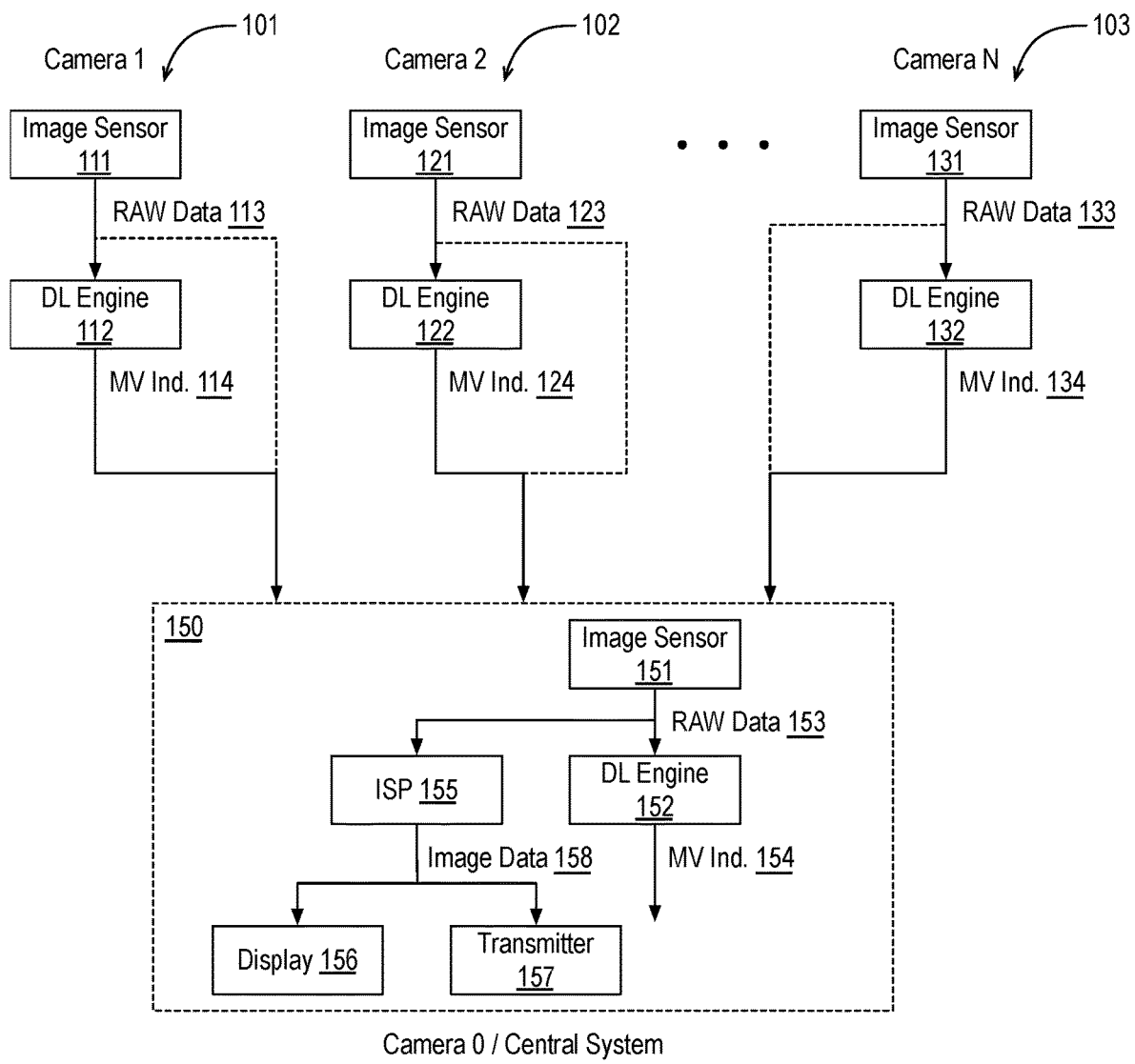
FIG. 1 is a diagram of an example machine vision system to provide machine vision monitoring of a variety of locations.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value. Unless otherwise specified the use of the ordinal adjectives "first," "second," and "third," etc., to describe a common object, merely indicate that different instances of like objects are being referred to, and are not intended to imply that the objects so described must be in a given sequence, either temporally, spatially, in ranking or in any other manner.

Methods, devices, apparatuses, systems, and articles are described herein related to machine vision camera systems and, in particular, to distributed machine vision camera systems that efficiently implement deep learning.

As described above, it may be advantageous to implement machine vision camera systems in a cost effective and computationally efficient manner. In some embodiments, a deep learning based machine vision camera system includes any number of deep learning based machine vision camera devices distributed in a machine vision environment such as a factory. The deep learning based machine vision camera system also includes one or more central cameras or central systems having other functionalities than the distributed deep learning based machine vision camera devices.

Each deep learning based machine vision camera device (e.g., distributed device) includes optics and an image sensor to output raw image data based on image capture of a scene, but the distributed device does not deploy an image signal processor (ISP) to, among other tasks, convert the raw image data to a viewable image data format. Furthermore, the deep learning based machine vision camera device includes a processor to implement a deep learning engine directly on the raw image data. The deep learning engine may be pretrained to perform any machine vision task and may output any suitable machine vision indicators. As used herein, the term image signal processor indicates a specialized digital signal processor that provides at least conversion of raw image data to a viewable image data format. An image signal processor may perform other tasks to improve the viewable image data as discussed herein.

As used herein, the term raw image data or format or similar terminology indicates image data that is directly from an image sensor or is minimally processed but is not processed to be ready for display, to be printed, to be edited with a graphics editor, and so on. The raw image data may be from a monochromatic sensor or from a chromatic sensor (e.g., an RGB, red-green-blue, sensor). Notably, in the case of chromatic sensors, the raw image data is not demosaiced.

In contrast, as used herein, the term viewable image data or format or similar terminology indicates image data that has been processed and is ready for display, to be printed, to be edited with a graphics editor, and so on. Although both raw image data and viewable image data represent image data from the capture of a scene they differ in the ability of a display or similar device to present the image of the scene for display without additional processing. That is, raw image data cannot be displayed without conversion to viewable image data, while viewable image data is readily displayed by the display device. In either case, the term image data refers to data that may generate or corresponds to a single picture or frame. Furthermore, multiple instances of image data may generate multiple corresponding pictures or frames.

Furthermore, as used herein, the term deep learning engine indicates any deep learning model that is implemented by a processor. Notably, the deep learning engine may be pretrained to perform a particular task and the corresponding deep learning engine architecture, weights, parameters, and so on may be saved to memory for implementation via the processor. The processor implementing the deep learning engine may be any processor such as a central processing unit, an application specific integrated circuit, a programmable logic device, or a field programmable gate array. Notably, the processor implementing the deep learning engine is incapable of converting the raw image data to a viewable image data format. Instead, the deep learning engine is applied directly to the raw image data to directly output machine vision indicators. As used herein, the terminology of a deep learning engine being applied directly to the raw image data indicates the input layer or input of the deep learning engine receives or is configured to receive a raw image data format. Notably, the input or input layer is not configured to receive viewable image data. The machine vision indicators output by the deep learning engine may be any suitable indicator(s) such as an indicator that a particular object or defect or the like has been detected, an indicator that the scene does not include an expected output or quality of output, indicators as to the likelihood of particular objects or defects or the like being detected, and so on.

Returning to discussion of the distributed camera devices, as discussed each deep learning based machine vision camera device includes an image sensor and processor to implement a deep learning engine on raw image data but not an ISP to convert raw image data to viewable image data nor an encoder to encode the viewable image data to a compressed bitstream for transmission to a central device. Notably, by applying the deep learning engine directly to raw image data, problems with application to viewable image data are avoided, such as loss of detail in the viewable image data with respect to the raw image data. Furthermore, by not implementing an ISP nor an encoder in the distributed camera devices, costs and complexity are avoided. For example, as discussed further herein, instead of transmitting all image data (e.g., after conversion to viewable image data and encode), only raw image data pertinent to a particular machine vision result may be transmitted. This saves overall bandwidth in the system as well as the cost and complexity of implementing ISPs and encoders in each of the distributed camera devices. For example, in system on a chip (SOC) implementations for machine vision cameras, the ISP and encoder are substantial in the cost and complexity of the machine vision camera in terms of hardware cost, power cost, and development cost. As will be appreciated, in machine vision system contexts, such as factories, many such distributed camera devices may be employed. Therefore, the savings in cost and complexity are substantial. For example, there are many production lines in a single modern factory and the need for multiple machine vision cameras on each production line provide for complex and costly implementations with the total cost of the entire machine vision camera system in one factory being high.

As discussed, such distributed camera devices apply a deep learning engine directly to raw image data for machine vision tasks such as defect detection. Upon such defect detection, at regular intervals, or after a particular number of defect detections, it may be desirable for a human to view image data corresponding to such events. As discussed, the distributed camera devices are not capable of generating such viewable image data. In some embodiments, the deep learning based machine vision camera system includes a central device, remote from all of the distributed camera devices, that is capable of converting the raw image data to a viewable image data format. As used herein, the term remote with respect to separate devices indicates the devices are implemented in separate housings and at different locations by any suitable measure of distance such as 1 m or 0.5 m. However, such remote devices may be communicatively coupled to one another by wired or wireless communication interfaces. The central device may be a camera device also including optics, an image sensor, and a processor to implement a deep learning engine or the central device may not include such camera functionality. In any event, the central device includes an ISP and to convert the raw image data to viewable image data such that the corresponding scene at the particular time instance of the raw image data may be viewed by a user. The central device is also able to include a display to display the viewable image data or a transmitter to transmit the viewable image data to another device for eventual display to a user.

FIG. 1 is a diagram of an example machine vision system 100 to provide machine vision monitoring of a variety of locations, arranged in accordance with at least some implementations of the present disclosure. As shown in FIG. 1, machine vision system 100 includes any number, N, of distributed camera devices such as camera devices 101, 102, 103 and a central device 150 such that central device 150 is communicatively coupled to each of camera devices 101, 102, 103. Camera devices 101, 102, 103 may be characterized as deep learning based machine vision cameras or simply as cameras. In the context of FIG. 1, central device 150 is illustrated as a camera device, however, central device 150 may be implemented as a non-camera device as discussed further herein.

Each of camera devices 101, 102, 103 includes optics (not shown in FIG. 1) trained on a particular location or scene, an image sensor to convert incoming light from the scene to raw image data, and a processor (not shown in FIG. 1) to implement a deep learning engine. That is, camera device 101 includes optics, an image sensor 111 to generate raw image data 113, and a processor to implement a deep learning engine 112, which generates machine vision indicators 114. Similarly, camera device 102 includes optics, an image sensor 121 to generate raw image data 123, and a processor to implement a deep learning engine 122, which generates machine vision indicators 124, and camera device 103 includes optics, an image sensor 131 to generate raw image data 133, and a processor to implement a deep learning engine 132, which generates machine vision indicators 134. Image sensors 111, 121, 131 may be monochromatic image sensors or chromatic image sensors.

Each of camera devices 101, 102, 103 performs substantially the same functions, including performing image capture of a scene to generate raw image data and direct application of a deep learning engine to the raw image data to generate machine vision indicators. Such functionality is typically discussed with respect to camera device 101 for the sake of clarity of presentation but applies to any of camera devices 101, 102, 103. Notably, camera devices 101, 102, 103 may be operating substantially simultaneously to monitor different locations or scenes via raw image data capture and analysis by direct application of deep learning engines.

In some embodiments, however, although performing the same functions, the applied deep learning engine by each of camera devices 101, 102, 103 may differ such that the deep learning engines implement different deep learning models for different machine vision tasks. For example, camera device 101 may apply a first deep learning engine (or model) and camera device 102 may apply a second deep learning engine (or model) such that the first and second deep learning engines employ different architectures, different weights and parameters, and so on for the implementation of different machine vision tasks. Such differing machine vision tasks may include detection of different object types, object detection versus image segmentation, etc. The different architectures may be between any deep learning models discussed herein such as a deep learning neural network such as a convolutional neural network (CNN), a recurrent neural network (RNN), a deep neural network (DNN), or the like having different numbers of convolutional layers, different kernels, different parameters, etc. or application of a deep learning neural network (CNN, RNN, DNN, etc.) in one camera device and application of another deep learning model.

Camera device 101 attains raw image data 113 via image capture of a scene at a particular time instance. The scene may include any suitable scene such as a view of a production line inclusive of an object under production. Although discussed herein with respect to factory and production line implementations, machine vision system 100 may be employed in any suitable context where multiple locations or scenes are to be monitored using machine vision such as security applications, surveillance applications, traffic monitoring applications, and so on. Raw image data 113 includes any suitable data format and as discussed, is not processed to be ready for display, to be printed, or to be edited with a bitmap graphics editor, and so on.

For each RAW image capture, camera device 101 applies deep learning engine 112 directly to raw image data 113 to generate machine vision indicators 114. As discussed, camera device 101 does not have the capability to convert raw image data 113 to viewable image data. Raw image data 113 is provided directly to an input layer or input of deep learning engine 112 and machine vision indicators 114 are provided directly from an output layer or output of deep learning engine 112. Deep learning engine 112 may implement any deep learning model such as any deep learning neural network discussed herein such as a deep learning neural network as discussed herein with respect to FIG. 8.

Machine vision indicators 114 may be any suitable machine vision indicator(s) in any suitable format. For example, deep learning engine 112 may output indicators as to whether a defect has been detected, a confidence level that a defect has been detected, indicators as to whether one or more particular objects have been detected, confidence levels that such particular objects have been detected, an indicator that the captured image matches or does not match an expected image, a confidence level that the captured image matches or does not match the expected image, and so on. Notably, deep learning engine 112 may be pretrained offline to perform such machine vision tasks using a training data set of many instances of raw image data.

As shown, machine vision indicators 114 may be transmitted to central device 150. In some embodiments, all of machine vision indicators 114 are transmitted to central device 150. In some embodiments, machine vision indicators 114 are only transmitted to central device 150 when a particular machine vision event has occurred such as detection of a defect, detection of a particular object, detection of a mismatch, etc. Furthermore, in response to machine vision indicators 114 indicating such an occurrence or in response to a request from central device 150, camera device 101 transmits raw image data 113 to central device 150 for processing. For example, camera device 101 transmits raw image data 113 in response to a positive machine vision result as indicated by machine vision indicators 114. As used herein, the term positive machine vision result indicates any machine vision result to be detected by machine vision system 100 such as presence of a defect, an object, a mismatch between image data and an expected image, and so on. The positive machine vision result may be detected by camera device 101 (and raw image data 113 may be transmitted by camera device 101 directly) or by central system 150 (and raw image data 113 may be transmitted by camera device 101 in response to a request by central device 150).

Central device 150 receives any of raw image data 113, 123, 133 on such occasions and central device 150 applies image processing via, for example, ISP 155 to any of raw image data 113, 123, 133 to convert any of raw image data 113, 123, 133 to viewable image data 158. Central device 150 may perform such a conversion using any suitable technique or techniques such as demosaicing techniques (in the context of chromatic image sensors), defect pixel correction, lens shading correction, spatial denoising, gamma correction, YUV (or other image format) conversion, edge enhancement, and/or temporal denoising. Notably, such a conversion must include conversion from a raw image data format to viewable image data format (e.g., raw to YUV conversion, raw to RGB conversion, etc.) and may include other operations for improved viewable image results. In some embodiments, such processing and ISP 155 are tuned solely to generate a high perceptual quality viewable image and are tuned without regard to conversion for use by a deep learning engine. As used herein, the term improved perceptual quality or similar terms indicate that a picture has improved perceptual quality or perceptual quality estimation relative to another picture.

The resultant viewable image data 158 generated by ISP 155 is received by one or both of display 156 and transmitter 157. In some embodiments, viewable image data 158 is presented to a user interfacing with central device 150. In some embodiments, viewable image data 158 is transmitted to another device for viewing by a user. Notably, in the context of a positive machine vision result, human viewing of viewable image data 158 may be desirable. Furthermore, viewable image data 158 and/or the corresponding raw image data 113, 123, 133 may be stored for future use. As discussed, resultant viewable image data 158 may be provided for presentment to a user by transmission to a local display, transmission to a local memory for eventual presentment via the local display, or transmission to a remote display device.

Also, as shown, central device 150 may have the same or similar functionality with respect to camera devices 101, 102, 103. For example, central device 150 may include optics, an image sensor 151 to generate raw image data 153, and a processor to implement a deep learning engine 152, which generates machine vision indicators 154. Such components may operate in the same or similar fashion with respect to corresponding components of camera devices 101, 102, 103. In some embodiments, central device 150 may be implemented as another camera device (e.g., a central camera device) of machine vision system 100 with additional functionality with respect to camera devices 101, 102, 103.

Machine vision system 100 provides deep learning based machine vision cameras (e.g., camera devices 101, 102, 103) that bypass ISP processing (i.e., do not include ISPs or other capability to convert raw image data to viewable image data). By not including ISP processing, improved detection accuracy may be provided (e.g., by using raw image data instead of viewable image data for deep learning techniques). As discussed, camera devices 101, 102, 103 do not perform deep learning machine vision operations on ISP processed results (e.g., viewable image data) that are human perceivable, but instead operate in the RAW/Bayer image domain (e.g., on raw image data). As discussed, desirable human interaction with respect to the raw image data is then achieved at central device 150 such that double confirmation of defect presence or similar human intervention may be provided in the production line or other location application. Notably, distributed machine vision system 100 includes a central device 150 (e.g., a single central intelligent machine vision camera or station) and multiple distributed camera devices 101, 102, 103 such that camera devices 101, 102, 103 produce raw data and do no other image processing while central device 150 may convert some raw image data to viewable image data for considerable bandwidth savings and improved system performance.

Machine vision system 100 provides for increased machine vision deep learning accuracy due to, at least in part, retained detail in the raw image data, reduced bandwidth requirements between camera devices 101, 102, 103 and central device 150, allowance for tuning of ISP 155 for only viewable image perceptual quality (as the viewable image data is not also used for machine vision), and reduced implementation complexity and cost.

Figure 2:
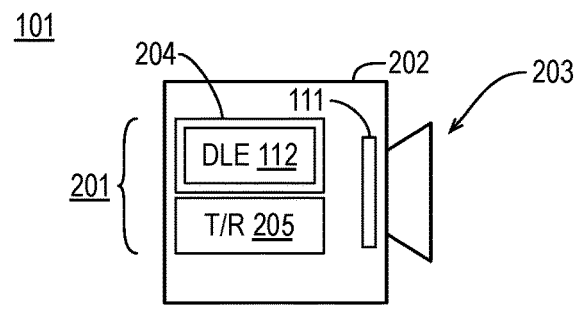
FIG. 2 is a diagram of example distributed camera device.

FIG. 2 is a diagram of example distributed camera device 101, arranged in accordance with at least some implementations of the present disclosure. As shown in FIG. 2, camera device 101 (and any of N camera devices 102, 103) includes optics 203, image sensor 111, a processor 204 to implement deep learning engine 112, and a transceiver 205. As shown, image sensor 111, processor 204, and transceiver 205 are contained within a housing 202 of camera device 101 such that no portion of image sensor 111, processor 204, and transceiver 205 extend outside of housing 202. As shown, optics 203 may at least partially extend outside of housing 202. For example, housing 202 may provide an outer surface of camera device 101 such that all componentry of camera device 101 is contained within camera device 101 with the exception of at least a portion of optics 203 (although in some embodiments optics 203 may also be entirely within housing 202).

Furthermore, camera device 101 does not include an image signal processor nor any other processor capable of converting raw image data to viewable image data within housing 202 as discussed herein. Notably, the configuration of machine vision system 100 obviates the need for such capability within housing 202. Similarly, camera device 101 does not include an encoder or codec processor or capability within housing 202 as discussed herein. The configuration of machine vision system 100, with respect to only transmitting raw image data as needed, again obviates the need for such capability within housing 202. In machine vision system 100, the capability of converting raw image data to viewable image data is provided by central device 150 therefore there is no need for encode/decode or codec operations at all.

Transceiver 205 may provide the capability of camera device 101 to transmit machine vision indicators 114 and raw image data 113 to central device 150 and to receive requests from central device 150 for raw image data 113 (if applicable). Processor 204 may be any suitable processor discussed herein for the application of deep learning engine 112 such as an application specific integrated circuit, a programmable logic device, or a field programmable gate array. As shown, in some embodiments, transceiver 205 and processor 204 are implemented as monolithic system on a chip 201 which may optionally include other functionality such as memory. As used herein, the term monolithic indicates a device that is discrete from other devices, although it may be coupled to other devices for communication and power supply.

Figure 3:
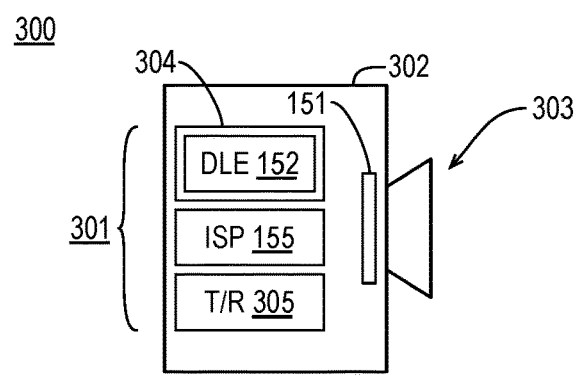
FIG. 3 is a diagram of an example central device implemented as a central camera device.

FIG. 3 is a diagram of an example central device 150 implemented as a central camera device 300, arranged in accordance with at least some implementations of the present disclosure. As shown in FIG. 3, central camera device 300, which may include any characteristics discussed with respect to central device 150, includes optics 303, image sensor 151, a processor 304 to implement deep learning engine 152, ISP 155 and a transceiver 305. As shown, image sensor 151, processor 304, ISP 155, and transceiver 305 are contained within a housing 302 of central camera device 300 such that no portion of image sensor 151, processor 304, ISP 155, and transceiver 305 extend outside of housing 302. As shown, optics 303 may at least partially extend outside of housing 302. For example, as with housing 202, housing 302 provides an outer surface of central camera device 300 such that all componentry thereof is contained within central camera device 300 with the exception of at least a portion of optics 303 (although optics 303 may also be entirely within housing 302).

Furthermore, central camera device 300 does not include a decoder or codec processor or capability within housing 302 as discussed herein. However, central camera device 300 provides image data conversion (e.g., from raw to viewable) as well as other optional image pre-processing operations as discussed with respect to FIG. 9. Transceiver 305 may provide the capability of central camera device 300 to receive machine vision indicators 114 and raw image data 113, to transmit requests for raw image data 113 (if applicable), and, optionally other interfaces to other factory systems such as a factory backend system. Processor 304 may be any suitable processor discussed herein for the application of deep learning engine 152 such as those discussed with respect to processor 204. In some embodiments, processor 304, ISP 155, and transceiver 305 are implemented as monolithic system on a chip 301 which may optionally include other functionality such as memory.

Figure 4:
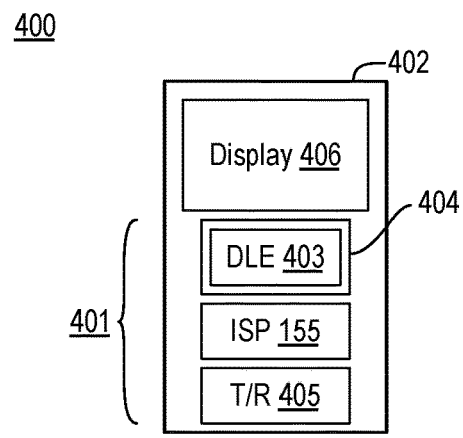
FIG. 4 is a diagram of an example central device implemented as a display device.

FIG. 4 is a diagram of an example central device 150 implemented as a display device 400, arranged in accordance with at least some implementations of the present disclosure. As shown in FIG. 4, display device 400, which may include any characteristics discussed with respect to central device 150, includes a display 406, a processor 404 to implement a deep learning engine 403, ISP 155 and a transceiver 405. Notably, display device 400 may not need a processor to implement a deep learning engine to raw image data as display device 400 does not attain raw image data within machine vision system 100. However, display device 400 may implement deep learning engine 403 on viewable image data such that the viewable image data is provided to an input or input layer of deep learning engine 403 and the output or output layer of deep learning engine 403 provides any machine vision indicators as discussed herein. Such techniques may allow for a double check of the machine vision indicators generated by the deep learning engine at a remote camera or for additional machine vision indicators to be detected and inspected.

In some embodiments, deep learning engine 403 implements a different deep learning model with respect to the original deep learning engine corresponding to the raw image data. For example, camera device 101 may apply a first deep learning engine (or model) to raw image data 113 and display device 400 may apply a second deep learning engine (or model) to viewable image data 158 such that the first and second deep learning engines employ different architectures, different weights and parameters, and so on for the implementation of the same or different machine vision tasks.

As shown, display 406, processor 404, ISP 155, and transceiver 405 are contained within a housing 402 of display device 400 as discussed above. Display 406 may include any display such as a touch screen display. In some embodiments, display 406 is implemented outside of housing 402 while processor 404, ISP 155, and transceiver 405 are contained within housing 402. Transceiver 405 may provide the capability of display device 400 to receive machine vision indicators 114 and raw image data 113, to transmit requests for raw image data 113 (if applicable), and, other optional interfaces. Processor 404 may be any suitable processor discussed herein for the application of deep learning engine 152 such as those discussed with respect to processor 204. In some embodiments, processor 404, ISP 155, and transceiver 405 are implemented as monolithic system on a chip 401 which may optionally include other functionality such as memory. Although illustrated with respect to display device 400, in some embodiments, central device 150 may include neither optics and an image sensor (e.g., a camera functionality) nor a display.

Figure 5:
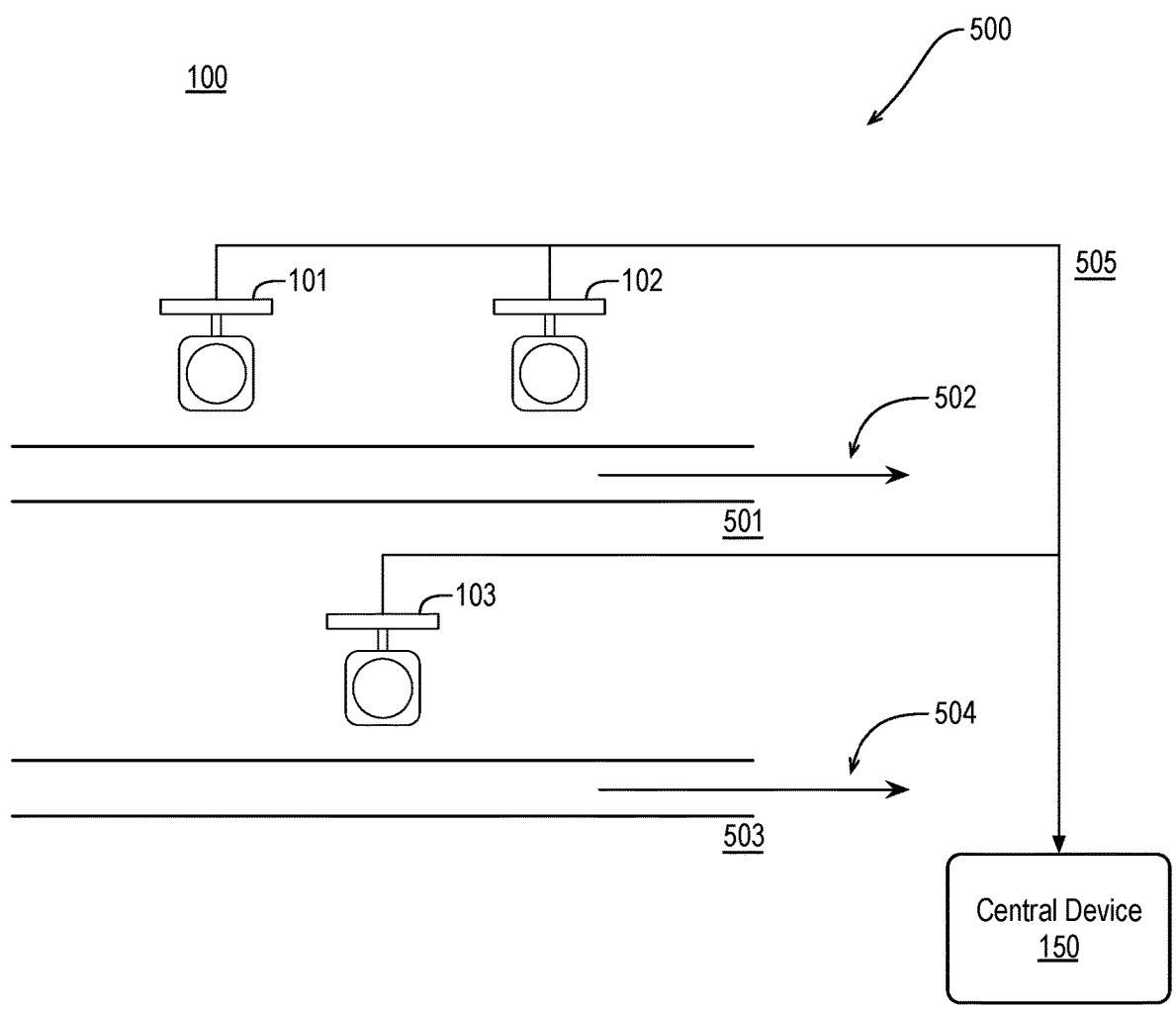
FIG. 5 is a diagram of an example factory installation of machine vision system.

FIG. 5 is a diagram of an example factory installation 500 of machine vision system 100, arranged in accordance with at least some implementations of the present disclosure. As shown in FIG. 5, machine vision system 100 may be implemented throughout a factory or a portion thereof such that one or more of camera devices 101, 102, 103 are installed for monitoring work in progress of the factory.

In the illustrated example, multiple camera devices 101, 102 are installed at locations of a product line 501 that moves work in progress (not shown) in a production direction 502. Each of camera devices 101, 102 then monitors a location or scene corresponding to a portion of product line 501. Furthermore, a single camera device 103 is installed at a location of product line 503 that moves work in progress (not shown) in a production direction 504. Camera device 103 monitors a location or scene corresponding to a portion of product line 503. Although illustrated with two camera devices monitoring a first product line and a single camera device monitoring a second product line, any number of camera devices may be used to monitor any number of product lines or product stations.

As discussed, each of camera devices 101, 102, 103 captures raw image data of the location corresponding thereto at particular time instances such that, at each time instance, a deep learning model is applied directly to the raw image data. Camera devices 101, 102, 103 are communicatively coupled to central device 150 via communicative coupling 505 such that camera devices 101, 102, 103 may provide machine vision indicators and raw image data to central device 150 for processing as discussed herein.

Although illustrated with respect to factory installation 500, machine vision system 100 may be installed in any context such as security applications, surveillance applications, traffic monitoring applications, and so on.

Figure 6:
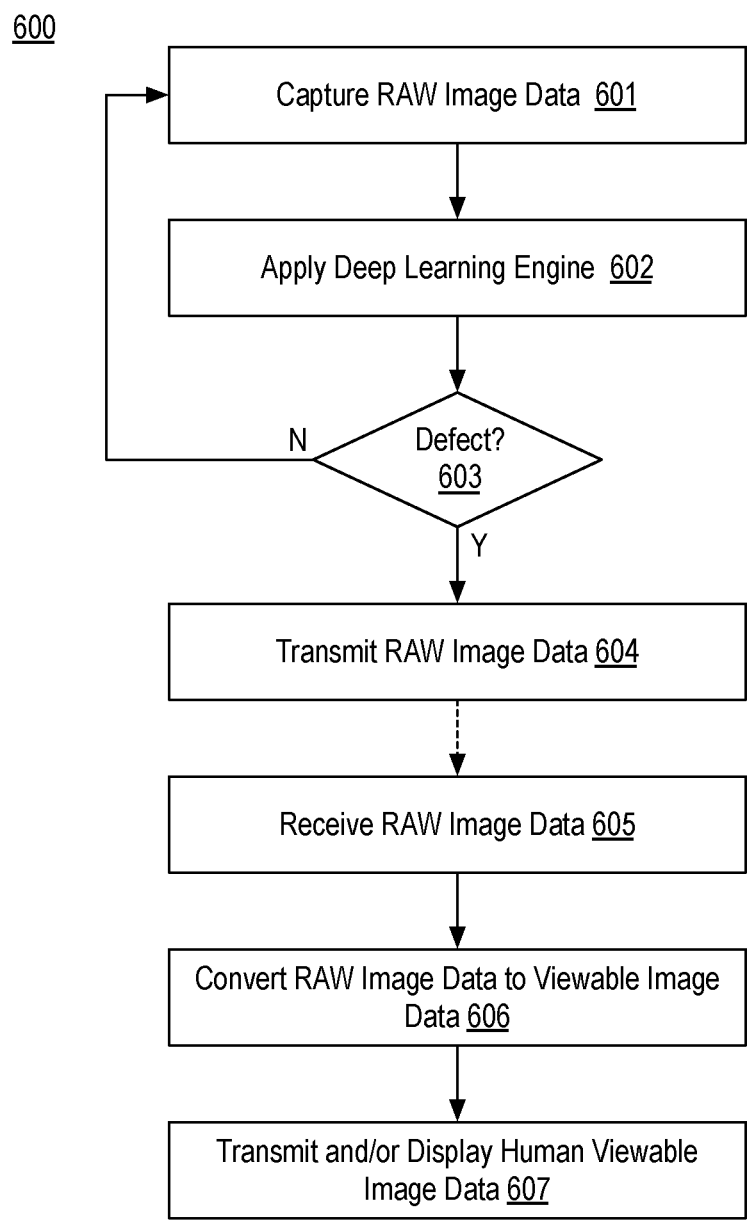
FIG. 6 illustrates an example process for implementing a distributed deep learning based machine vision camera system.

FIG. 6 illustrates an example process 600 for implementing a distributed deep learning based machine vision camera system, arranged in accordance with at least some implementations of the present disclosure. Process 600 may include one or more operations 601-607 as illustrated in FIG. 6. For example, operations 601-604 may be performed by camera devices 101, 102, 103 and operations 605-607 may be performed by central device 150.

Process 600 begins at operation 601, where raw image data is captured by one or more of camera devices 101, 102, 103. For example, each of N camera devices may attain raw image data by exposing an image sensor to a scene. In some embodiments, each of camera devices 101, 102, 103 attains raw image data (e.g., raw images) at time instances at a fixed time interval or when work in process arrives at a location, or the like.

Processing continues at operation 602, where a deep learning engine is applied directly to the raw image data. The deep learning engine may implement any suitable deep learning model. In some embodiments, the deep learning engine implements a deep learning neural network (CNN, RNN, DNN, etc.). As used herein, the term DLNN (deep learning neural network) indicates a pretrained deep learning neural network including an input layer, multiple hidden layers, and an output layer such that the hidden layers include one or more convolutional layers each including at least a convolutional layer (and optionally including, for example, a leaky RELU layer, a pooling layer, and/or a normalization layer). The DLNN may also include a flattening layer and fully connected layer. As discussed, the deep learning engine takes as input raw image data and provides as output machine vision indicators.

Processing continues at decision operation 603, where a determination is made, based on the machine vision indicators, whether a defect or other positive machine vision result (e.g., an object being detected, a person being detected, etc.) is attained. Such a determination may be made using any suitable technique or techniques. In some embodiments, the deep learning engine outputs a defect signal. In some embodiments, the outputs of the deep learning engine (i.e., the machine vision indicators) are analyzed to determine whether a defect or other positive machine vision result is present. In an embodiment, a defect probability or an object detection probability is compared to a predetermined threshold to determine whether a defect or other positive machine vision result is present, although other techniques may be used.

If no defect or other positive machine vision result is present, processing continues at operations 601, 602 as discussed above such that continual monitoring is provided until a defect or other positive machine vision result is realized. If a defect or other positive machine vision result is detected at operation 603, processing continues at operation 604, where the raw image data is transmitted from one of camera devices 101, 102, 103 to central device 150. Notably, the machine vision indicators attained at operation 602 may be provided to central device 150 regardless of whether a defect or other positive machine vision result is detected at operation 603 in some embodiments. In the context of process 600, raw image data may be transmitted responsive to a defect or other positive machine vision result being detected under the assumption that such an event triggers the result of a person needing to review viewable image data corresponding to the defect or other positive machine vision result.

For example, an image sensor of any camera devices 101, 102, 103 may generate raw image data (for an image) based on image capture of a scene at a first time instance and multiple instances of raw image data (for multiple images) based on subsequent image capture of the scene at multiple subsequent time instances. The processor of any camera devices 101, 102, 103 may apply directly to the deep learning engine of any camera devices 101, 102, 103 to each of the multiple instances of raw image data to generate corresponding instances of machine vision indicators (i.e., for each time instance/image), and the processor may only transmit any of the multiple instances of raw image data in response to a positive machine vision result and not transmit any of the multiple instances of raw image data corresponding to negative machine vision results. Thereby, bandwidth savings within machine vision system 100 are attained as only raw image data corresponding to positive machine vision results are communicated.

Processing continues at operation 605, where the raw image data transmitted by one of camera devices 101, 102, 103 is received by central device 150. The raw image data may be transmitted and received over any suitable wired or wireless communications protocol.

Processing continues at operation 606, where the raw image data is converted to viewable image data. Such conversion may include any suitable technique or techniques. In an embodiment, the conversion is implemented in an image processing pipeline via an image signal processor. The viewable image data format may be any suitable data format such as a YUV format, an RGB format etc. An exemplary viewable image format is the JPG file format, although any suitable viewable image data format may be used.

Processing continues at operation 607, where the viewable image data is transmitted to a remote device for display or is presented for display via central device 150. In some embodiments, the viewable image data is transmitted for presentment such that it is presented via local display, stored locally to memory for later display, or transmitted to a remote device for immediate or later display.

Figure 7:
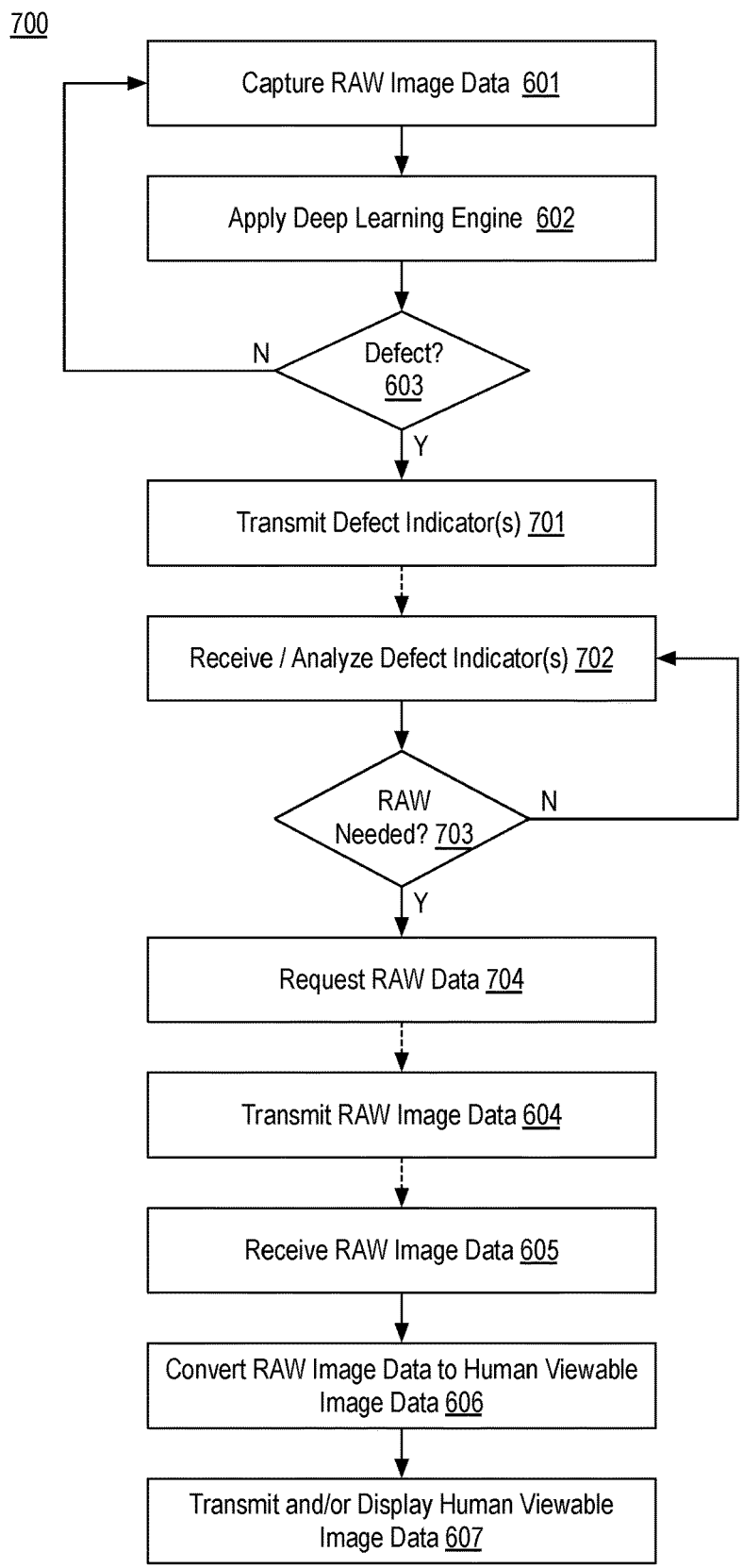
FIG. 7 illustrates another example process for implementing a distributed deep learning based machine vision camera system.

FIG. 7 illustrates another example process 700 for implementing a distributed deep learning based machine vision camera system, arranged in accordance with at least some implementations of the present disclosure. Process 700 may include one or more operations 601-603, 701-704, and 604-607, as illustrated in FIG. 7. For example, operations 601-603, 701, and 604 may be performed by camera devices 101, 102, 103 and operations 701-704 and 605-607 may be performed by central device 150.

Process 600 begins at operations 601, 602, 603, where raw image data is captured by one or more of camera devices 101, 102, 103, a deep learning engine is applied directly to the raw image data, and a determination is made, based on the machine vision indicators, whether a defect or other positive machine vision result (e.g., an object being detected, a person being detected, etc.) is attained. Such operations may be performed using any techniques as discussed with respect to process 600. In some embodiments, decision operation 603 is bypassed and any and all machine vision indicators are transmitted from camera devices 101, 102, 103 to central device 150.

Processing continues at operation 701, where the machine vision indicators (e.g., either those pertaining to a defect or other positive machine vision result or all such machine vision indicators) are transmitted from any one of camera devices 101, 102, 103.

Processing continues at operation 702, where the machine vision indicators transmitted by one of camera devices 101, 102, 103 are received and analyzed by central device 150. The machine vision indicators may be transmitted and received over any suitable wired or wireless communications protocol.

Processing continues at decision operation 703, where a determination is made as to whether raw image data are needed by central device 150. Such a determination may be made using any suitable technique or techniques. In some embodiments, any raw image data pertaining to any defect or other positive machine vision result is requested. In some embodiments, only raw image data pertaining to particular defects or other positive machine vision results is requested. For example, only certain defects or objects may trigger a raw image data request. In some embodiments, only a particular number or frequency of defects or other positive machine vision results trigger a raw image data request. For example, a defect rate (or positive machine vision result) may be determined and, if greater than a threshold, raw image data may be requested. If no raw data request is to be made, processing continues at operation 702.

If so, processing continues at operation 704, where central device 150 issues a request for the pertinent raw image data and operations 604-607, which may be performed as discussed with respect to process 600. Process 700 provides for increased flexibility and reduced bandwidth for machine vision system 100 such that additional raw image data may not be transmitted from camera devices 101, 102, 103 to central device 150 in certain contexts.

Figure 8:
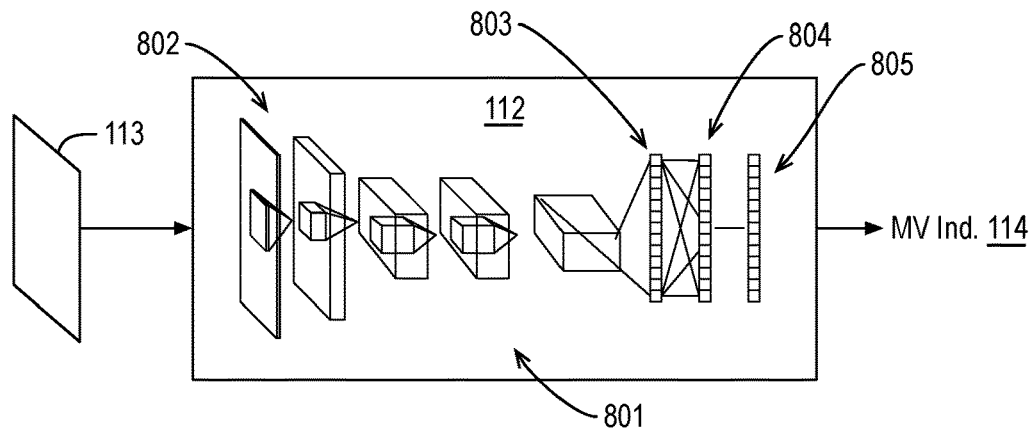
FIG. 8 illustrates exemplary implementation of a deep learning neural network to raw image data via a deep learning engine.

FIG. 8 illustrates exemplary implementation of a deep learning neural network 801 to raw image data 113 via deep learning engine 112, arranged in accordance with at least some implementations of the present disclosure. Deep learning neural network (DLNN) 801 may include any suitable CNN, RNN, or DNN. As discussed above, raw image data 113 includes unprocessed or low processed image data that is not yet suitable for display, to be printed, to be edited with a bitmap graphics editor, and so on. In some embodiments, deep learning engine 112 applies a pre-trained deep learning neural network (CNN, RNN, DNN, etc.) 801 to raw image data 113 to generate machine vision indicators 114.

As shown, DLNN 801 implements a number of convolutional layers 802. Each convolutional layer 802 of DLNN 801 receives raw image data 113 or a preceding set of feature maps from a previous layer and each convolutional layer applies a predetermined number of convolution kernels having a predetermined size and stride to the incoming data to generate feature maps. Each convolutional layer 802 may also optionally include or be followed by various combinations of rectified linear units (ReLU), max pooling operations, and/or local response normalization (LRN) operations, as is known in the art, to generate the discussed feature maps.

Furthermore, DLNN 801, after convolutional layers 802, may include a flattening layer 803 to transpose the final feature maps of the convolutional layers to a vector and a fully connected layer 804 to determine classifications or probabilities of various objects, defects, or other machine vision results, which are provided from output layer 805 of DLNN 801 as machine vision indicators 114. Based on the pre-training of DLNN 801, machine vision indicators 114 are generated and used in the context of machine vision system 100 as discussed herein.

As used in any implementation described herein, the term "module" refers to any combination of software logic, firmware logic, hardware logic, and/or circuitry configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, fixed function circuitry, execution unit circuitry, and/or firmware that stores instructions executed by programmable circuitry. The modules may, collectively or individually, be embodied as circuitry that forms part of a larger system, for example, an integrated circuit (IC), system on-chip (SoC), and so forth.

Figure 9:
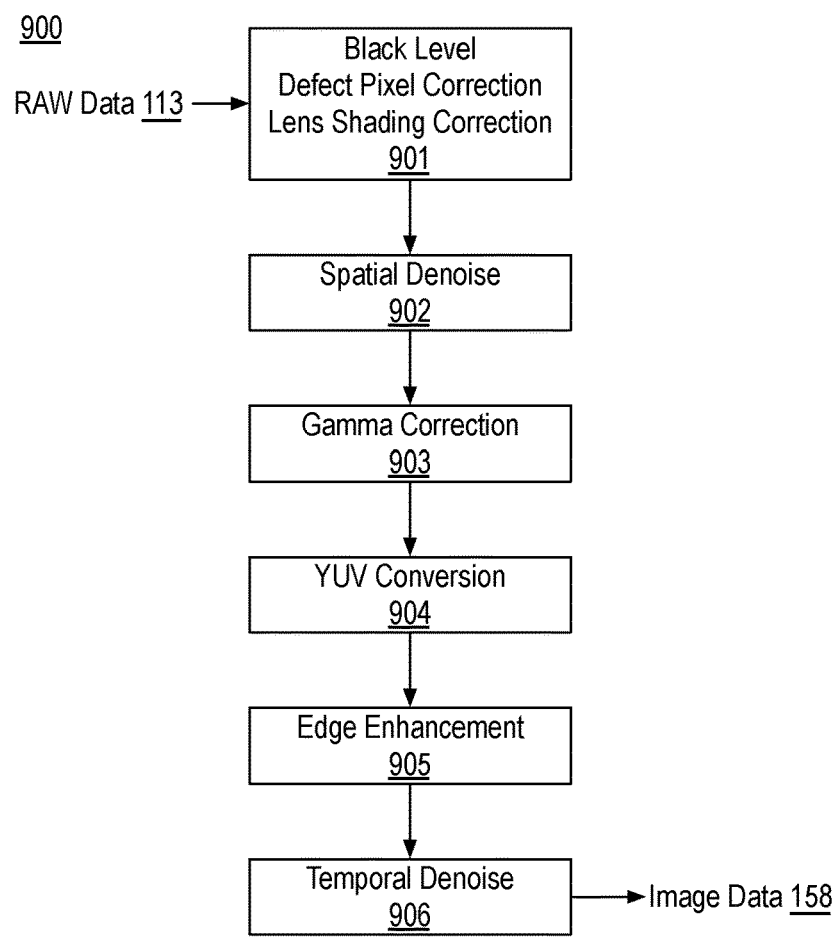
FIG. 9 illustrates an exemplary image signal processor implementation to convert raw image data to viewable image data.

FIG. 9 illustrates an exemplary image signal processor 900 implementation to convert raw image data to viewable image data, arranged in accordance with at least some implementations of the present disclosure. As shown in FIG. 9, image signal processor (ISP) 900 may include a black level, defect pixel correction, and lens shading correction module 901, a spatial denoise module 902, a gamma correction module 903, a YUV conversion module 904, an edge enhancement module 905, and a temporal denoise module 906. ISP 900 may be implemented as ISP 155 as discussed herein. The modules of ISP 900 may be provided in a pipeline as shown in FIG. 9 and may provide an image processing or pre-processing pipeline. As discussed herein, ISP 900 must at least convert raw image data 113 to viewable image data 158. Other modules of ISP 900 improve the perceptual quality of viewable image data 158. In some embodiments, ISP 900 further includes a demosaic module prior to module 902. In particular, demosaic processing is needed to process chromatic raw image data 113. For example, lens shading correction module 901 may be a sensor module related to features that are different in different cameras while the demosaic module may be a universal module such that it is substantially the same in all cameras with the demosaic module being implemented separately from lens shading correction module 901. In some embodiments, ISP 900 is implemented as part of a monolithic system on a chip. In some embodiments, ISP 900 is implemented as a monolithic integrated circuit.

As shown, raw image data 113 is received by black level, defect pixel correction, and lens shading correction module 901, which adjusts black level (e.g., the level of brightness in the darkest part of raw image data 113 such that image information is not lost), corrects pixel defects (e.g., adjusts hot pixels, applies values to missing pixels), and provides shading correction (e.g., to removing image defects from the imaging system of camera device 101). The resultant image data is provided to spatial denoise module 902, which removes or mitigates spatial noise in an image such as salt and pepper noise and Gaussian noise, and then to gamma correction module 903, which applies gamma correction related to eventual display via a display device.

The resultant image data is then received by YUV conversion module 904, which converts the image data to a viewable image data format such as YUV (as illustrated), RGB, or the like. As discussed, a deep learning engine is applied, at remote cameras, directly to raw image data 113 (e.g., in a non-viewable format). Conversion of raw image data 113 to viewable image data provides for human viewing of image data corresponding to defects or other positive machine vision results. Such conversion (and other processing performed by ISP 900) is performed at a centralized device while the remote cameras do not have such capabilities.

As shown, the resultant viewable image data is provided to edge enhancement module 905, which may enhance edges in the viewable image data by applying edge enhancement filtering or other techniques. Furthermore, temporal denoise module 906 may apply temporal image denoising using temporally previous images by merging pixels of a current image and one or more previous images based on temporal tracking (e.g., motion vector fields, optical flow tracking, or the like). The resultant viewable image data 158 may be stored to memory, transmitted to a display for presentment to a user, transmitted to another device, and so on.

Figure 10:
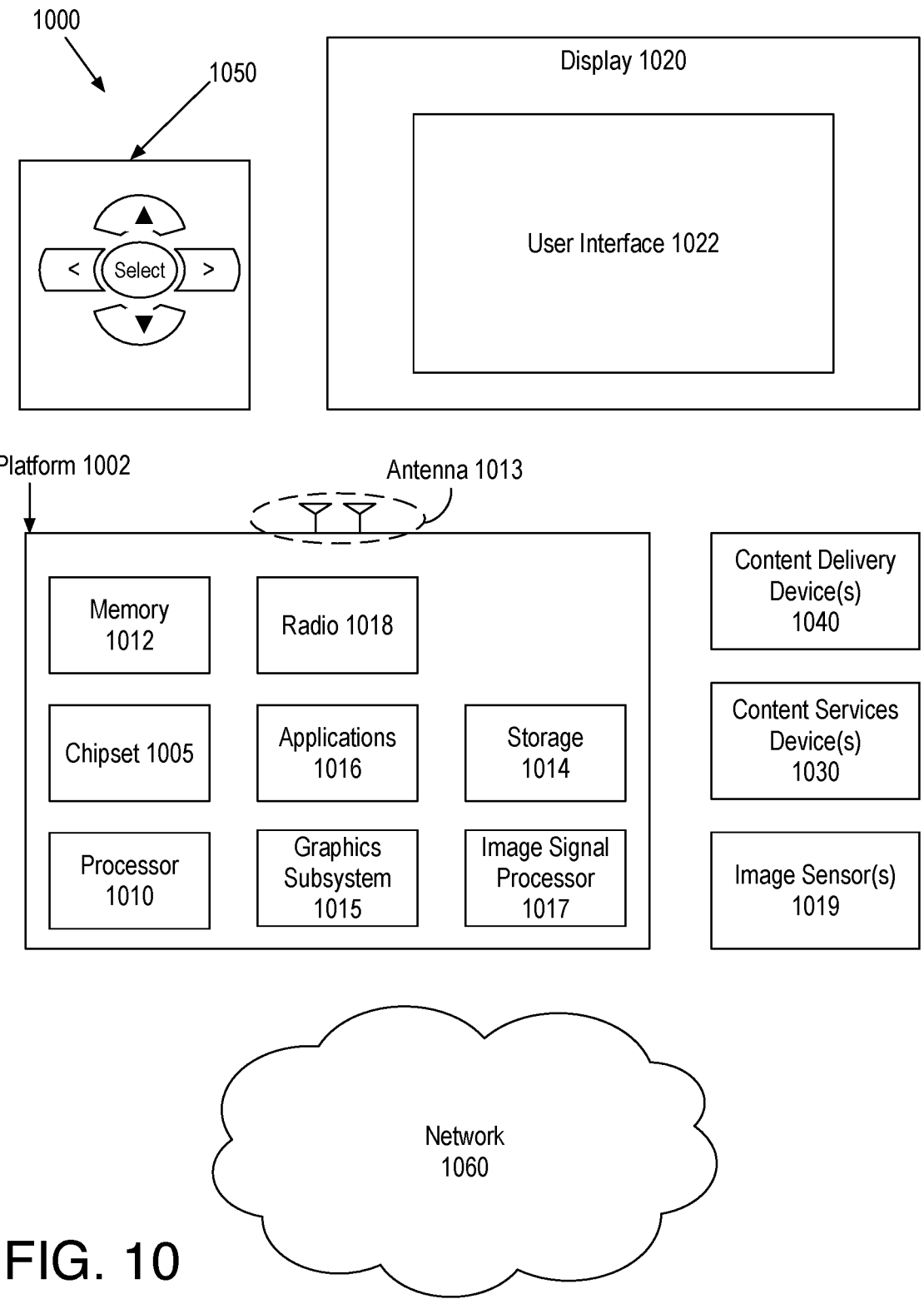
FIG. 10 is an illustrative diagram of an example system.

FIG. 10 is an illustrative diagram of an example system 1000, arranged in accordance with at least some implementations of the present disclosure. In various implementations, system 1000 may be a mobile device system although system 1000 is not limited to this context. For example, system 1000 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), a surveillance camera, a surveillance system including a camera, and so forth. For example, system 1000 may be implemented as central device 150.

In various implementations, system 1000 includes a platform 1002 coupled to a display 1020. Platform 1002 may receive content from a content device such as content services device(s) 1030 or content delivery device(s) 1040 or other content sources such as image sensors 1019. For example, platform 1002 may receive image data as discussed herein from image sensors 1019 or any other content source. A navigation controller 1050 including one or more navigation features may be used to interact with, for example, platform 1002 and/or display 1020. Each of these components is described in greater detail below.

In various implementations, platform 1002 may include any combination of a chipset 1005, processor 1010, memory 1012, antenna 1013, storage 1014, graphics subsystem 1015, applications 1016, image signal processor 1017 and/or radio 1018. Chipset 1005 may provide intercommunication among processor 1010, memory 1012, storage 1014, graphics subsystem 1015, applications 1016, image signal processor 1017 and/or radio 1018. For example, chipset 1005 may include a storage adapter (not depicted) capable of providing intercommunication with storage 1014.

Processor 1010 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 1010 may be dual-core processor(s), dual-core mobile processor(s), and so forth.

Memory 1012 may be implemented as a volatile memory device such as, but not limited to, a Random Access Memory (RAM), Dynamic Random Access Memory (DRAM), or Static RAM (SRAM).

Storage 1014 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 1014 may include technology to increase the storage performance enhanced protection for valuable digital media when multiple hard drives are included, for example.

Image signal processor 1017 may be implemented as a specialized digital signal processor or the like used for image processing. In some examples, image signal processor 1017 may be implemented based on a single instruction multiple data or multiple instruction multiple data architecture or the like. In some examples, image signal processor 1017 may be characterized as a media processor. As discussed herein, image signal processor 1017 may be implemented based on a system on a chip architecture and/or based on a multi-core architecture.

Graphics subsystem 1015 may perform processing of images such as still or video for display. Graphics subsystem 1015 may be a graphics processing unit (GPU) or a visual processing unit (VPU), for example. An analog or digital interface may be used to communicatively couple graphics subsystem 1015 and display 1020. For example, the interface may be any of a High-Definition Multimedia Interface, DisplayPort, wireless HDMI, and/or wireless HD compliant techniques. Graphics subsystem 1015 may be integrated into processor 1010 or chipset 1005. In some implementations, graphics subsystem 1015 may be a stand-alone device communicatively coupled to chipset 1005.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 1018 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 1018 may operate in accordance with one or more applicable standards in any version.

In various implementations, display 1020 may include any television type monitor or display. Display 1020 may include, for example, a computer display screen, touch screen display, video monitor, television-like device, and/or a television. Display 1020 may be digital and/or analog. In various implementations, display 1020 may be a holographic display. Also, display 1020 may be a transparent surface that may receive a visual projection. Such projections may convey various forms of information, images, and/or objects. For example, such projections may be a visual overlay for a mobile augmented reality (MAR) application. Under the control of one or more software applications 1016, platform 1002 may display user interface 1022 on display 1020.

In various implementations, content services device(s) 1030 may be hosted by any national, international and/or independent service and thus accessible to platform 1002 via the Internet, for example. Content services device(s) 1030 may be coupled to platform 1002 and/or to display 1020. Platform 1002 and/or content services device(s) 1030 may be coupled to a network 1060 to communicate (e.g., send and/or receive) media information to and from network 1060. Content delivery device(s) 1040 also may be coupled to platform 1002 and/or to display 1020.

Image sensors 1019 may include any suitable image sensors that may provide image data based on a scene. For example, image sensors 1019 may include a semiconductor charge coupled device (CCD) based sensor, a complimentary metal-oxide-semiconductor (CMOS) based sensor, an N-type metal-oxide-semiconductor (NMOS) based sensor, or the like. For example, image sensors 1019 may include any device that may detect information of a scene to generate image data.

In various implementations, content services device(s) 1030 may include a cable television box, personal computer, network, telephone, Internet enabled devices or appliance capable of delivering digital information and/or content, and any other similar device capable of uni-directionally or bi-directionally communicating content between content providers and platform 1002 and/display 1020, via network 1060 or directly. It will be appreciated that the content may be communicated uni-directionally and/or bi-directionally to and from any one of the components in system 1000 and a content provider via network 1060. Examples of content may include any media information including, for example, video, music, medical and gaming information, and so forth.

Content services device(s) 1030 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 1002 may receive control signals from navigation controller 1050 having one or more navigation features. The navigation features of navigation controller 1050 may be used to interact with user interface 1022, for example. In various embodiments, navigation controller 1050 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of navigation controller 1050 may be replicated on a display (e.g., display 1020) by movements of a pointer, cursor, focus ring, or other visual indicators displayed on the display. For example, under the control of software applications 1016, the navigation features located on navigation controller 1050 may be mapped to virtual navigation features displayed on user interface 1022, for example. In various embodiments, navigation controller 1050 may not be a separate component but may be integrated into platform 1002 and/or display 1020. The present disclosure, however, is not limited to the elements or in the context shown or described herein.

In various implementations, drivers (not shown) may include technology to enable users to instantly turn on and off platform 1002 like a television with the touch of a button after initial boot-up, when enabled, for example. Program logic may allow platform 1002 to stream content to media adaptors or other content services device(s) 1030 or content delivery device(s) 1040 even when the platform is turned "off." In addition, chipset 1005 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 1000 may be integrated. For example, platform 1002 and content services device(s) 1030 may be integrated, or platform 1002 and content delivery device(s) 1040 may be integrated, or platform 1002, content services device(s) 1030, and content delivery device(s) 1040 may be integrated, for example. In various embodiments, platform 1002 and display 1020 may be an integrated unit. Display 1020 and content service device(s) 1030 may be integrated, or display 1020 and content delivery device(s) 1040 may be integrated, for example. These examples are not meant to limit the present disclosure.

In various embodiments, system 1000 may be implemented as a wireless system, a wired system, or a combination of both. When implemented as a wireless system, system 1000 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 1000 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 1002 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 10.

Figure 11:
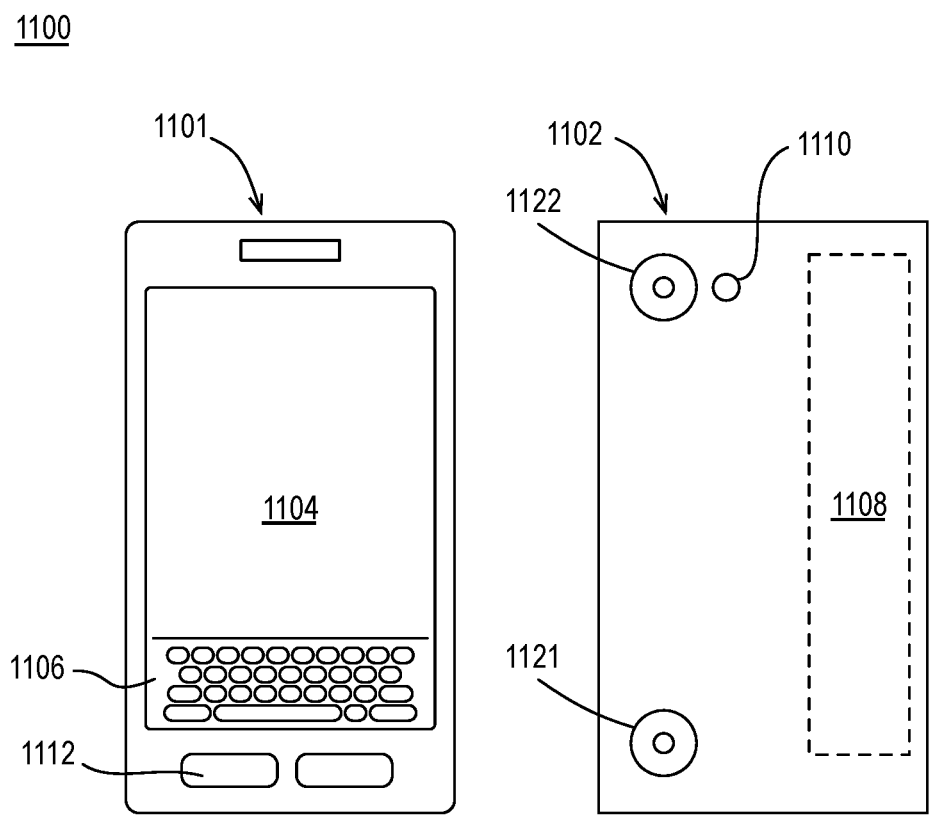
FIG. 11 illustrates an example device, all arranged in accordance with at least some implementations of the present disclosure.

As described above, system 1000 may be embodied in varying physical styles or form factors. FIG. 11 illustrates an example small form factor device 1100, arranged in accordance with at least some implementations of the present disclosure. In some examples, system 1000 may be implemented via device 1100. In other examples, other systems, components, or modules discussed herein or portions thereof may be implemented via device 1100. In various embodiments, for example, device 1100 may be implemented as a mobile computing device a having wireless capabilities. A mobile computing device may refer to any device having a processing system and a mobile power source or supply, such as one or more batteries, for example.

Examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, smart device (e.g., smartphone, smart tablet or smart mobile television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be implemented by a motor vehicle or robot, or worn by a person, such as wrist computers, finger computers, ring computers, eyeglass computers, belt-clip computers, arm-band computers, shoe computers, clothing computers, and other wearable computers. In various embodiments, for example, a mobile computing device may be implemented as a smartphone capable of executing computer applications, as well as voice communications and/or data communications. Although some embodiments may be described with a mobile computing device implemented as a smartphone by way of example, it may be appreciated that other embodiments may be implemented using other wireless mobile computing devices as well. The embodiments are not limited in this context.

As shown in FIG. 11, device 1100 may include a housing with a front 1101 and a back 1102. Device 1100 includes a display 1104, an input/output (I/O) device 1106, a color camera 1121, a color camera 1122, an infrared transmitter 1123, and an integrated antenna 1108. In some embodiments, color camera 1121 and color camera 1122 attain planar images as discussed herein. In some embodiments, device 1100 does not include color camera 1121 and 1122 and device 1100 attains input image data (e.g., any input image data discussed herein) from another device. Device 1100 also may include navigation features 1112. I/O device 1106 may include any suitable I/O device for entering information into a mobile computing device. Examples for I/O device 1106 may include an alphanumeric keyboard, a numeric keypad, a touch pad, input keys, buttons, switches, microphones, speakers, voice recognition device and software, and so forth. Information also may be entered into device 1100 by way of microphone (not shown), or may be digitized by a voice recognition device. As shown, device 1100 may include color cameras 1121, 1122, and a flash 1110 integrated into back 1102 (or elsewhere) of device 1100. In other examples, color cameras 1121, 1122, and flash 1110 may be integrated into front 1101 of device 1100 or both front and back sets of cameras may be provided. Color cameras 1121, 1122 and a flash 1110 may be components of a camera module to originate color image data with IR texture correction that may be processed into an image or streaming video that is output to display 1104 and/or communicated remotely from device 1100 via antenna 1108 for example.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as IP cores may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

In one or more first embodiments, a method for implementing a machine vision camera system comprises generating, via an image sensor of a first camera device, raw image data, directly applying, via a processor of the first camera device, a deep learning engine to the raw image data to generate one or more machine vision indicators, transmitting, from the first camera device, the raw image data in response to the one or more machine vision indicators indicating a positive machine vision result, receiving, via a second device remote from the first camera device, the raw image data, converting, via an image signal processor of the second device, the raw image data to viewable image data, and transmitting, from the second device, the viewable image data to a third device or displaying, via a display of the second device, the viewable image data.

In one or more second embodiments, further to the first embodiments, the second device is a second camera device comprising a second image sensor to generate second raw image data and the first camera device comprises a housing containing the image sensor and the processor, and wherein the housing does not contain a second image signal processor capable of converting the raw image data to viewable image data.

In one or more third embodiments, further to the first or second embodiments, the processor is implemented on a first monolithic system on a chip, wherein the second camera device further comprises a second processor to implement a second deep learning engine, and wherein the image signal processor and the second processor are implemented on a second monolithic system on a chip.

In one or more fourth embodiments, further to the first through third embodiments, the second camera device comprises a second housing containing the image signal processor and the second image sensor, and wherein the second housing does not contain a decoder capable of decoding compressed viewable image data.

In one or more fifth embodiments, further to the first through fourth embodiments, the method further comprises generating, via image sensors each corresponding to one of a plurality of camera devices, corresponding raw image data and directly applying, via processors each corresponding to one of a plurality of camera devices and to implement a corresponding deep learning engine, corresponding deep learning engines to the corresponding raw image data.

In one or more sixth embodiments, further to the first through fifth embodiments, the method further comprises generating, via a second image sensor of a second camera device, second raw image data and directly applying, via a processor of the second camera device, a second deep learning engine to the second raw image data to generate one or more second machine vision indicators, wherein the first deep learning engine and the second deep learning engine comprise different deep learning models for different machine vision tasks.

In one or more seventh embodiments, further to the first through sixth embodiments, the raw image data is provided directly to an input layer of the deep learning engine and the one or more machine vision indicators are provided directly from an output layer of the deep learning engine.

In one or more eighth embodiments, further to the first through seventh embodiments, the image sensor is to generate the raw image data based on image capture of a scene at a first time instance and the method further comprises generating, via the image sensor, a plurality of subsequent raw image data instances based on image capture of the scene at a plurality of subsequent time instances, directly applying, via the processor, to each of the plurality of subsequent raw image data instances to generate corresponding machine vision indicators, and transmitting, from the first camera device, any of the plurality of subsequent raw image data instances in response to a positive machine vision result and not transmitting any of the plurality of subsequent raw image data instances corresponding to negative machine vision results.

In one or more ninth embodiments, further to the first through eighth embodiments, the image signal processor is tuned solely to generate a high perceptual quality viewable image.

In one or more tenth embodiments, further to the first through ninth embodiments, the deep learning engine comprises a convolutional neural network.

In one or more eleventh embodiments, a machine vision camera system includes a first camera device comprising a first camera device and a second device to perform a method according to any one of the above embodiments.

In one or more twelfth embodiments, at least one machine readable medium includes a plurality of instructions that in response to being executed on a plurality of devices, cause the devices to perform a method according to any one of the above embodiments.

In one or more thirteenth embodiments, a system include means for performing a method according to any one of the above embodiments.

In one or more fourteenth embodiments, a machine vision camera system comprises a first camera device comprising an image sensor to generate raw image data and a processor to directly apply a deep learning engine to the raw image data to generate one or more machine vision indicators and to transmit the raw image data in response to the one or more machine vision indicators indicating a positive machine vision result, and a second device, remote from the first camera device, to receive the raw image data, the second device comprising an image signal processor to convert the raw image data to viewable image data and one of a transmitter to transmit the viewable image data to a third device or a display to display the viewable image data.

In one or more fifteenth embodiments, further to the fourteenth embodiments, the second device is a second camera device comprising a second image sensor to generate second raw image data and the first camera device comprises a housing containing the image sensor and the processor, and wherein the housing does not contain a second image signal processor capable of converting the raw image data to viewable image data nor an encoder to encode image data.

In one or more sixteenth embodiments, further to the fourteenth or fifteenth embodiments, the processor is implemented on a first monolithic system on a chip, wherein the second camera device further comprises a second processor to implement a second deep learning engine, and wherein the image signal processor and the second processor are implemented on a second monolithic system on a chip.

In one or more seventeenth embodiments, further to the fourteenth through sixteenth embodiments, the second camera device comprises a second housing containing the image signal processor and the second image sensor, and wherein the second housing does not contain a decoder capable of decoding compressed viewable image data.

In one or more eighteenth embodiments, further to the fourteenth through seventeenth embodiments, the system further comprises a plurality of camera devices each comprising a corresponding image sensor to generate corresponding raw image data and a processor to directly apply a corresponding deep learning engine to the corresponding raw image data.

In one or more nineteenth embodiments, further to the fourteenth through eighteenth embodiments, the system further comprises a second camera device comprising a second image sensor to generate second raw image data and a second processor to directly apply a second deep learning engine to the second raw image data to generate one or more second machine vision indicators, wherein the first deep learning engine and the second deep learning engine comprise different deep learning models for different machine vision tasks.

In one or more twentieth embodiments, further to the fourteenth through nineteenth embodiments, the raw image data is provided directly to an input layer of the deep learning engine and the one or more machine vision indicators are provided directly from an output layer of the deep learning engine.

In one or more twenty-first embodiments, further to the fourteenth through twentieth embodiments, the image sensor is to generate the raw image data based on image capture of a scene at a first time instance and to generate a plurality of subsequent raw image data instances based on image capture of the scene at a plurality of subsequent time instances, wherein the processor is to directly apply the deep learning engine to each of the plurality of subsequent raw image data instances to generate corresponding machine vision indicators, and wherein the processor is to only transmit any of the plurality of subsequent raw image data instances in response to a positive machine vision result and not to transmit any of the plurality of subsequent raw image data instances corresponding to negative machine vision results.

In one or more twenty-second embodiments, further to the fourteenth through twenty-first embodiments, the image signal processor is tuned solely to generate a high perceptual quality viewable image.

In one or more twenty-third embodiments, further to the fourteenth through twenty-second embodiments, the deep learning engine comprises a deep learning neural network.

It will be recognized that the embodiments are not limited to the embodiments so described, but can be practiced with modification and alteration without departing from the scope of the appended claims. For example, the above embodiments may include specific combination of features. However, the above embodiments are not limited in this regard and, in various implementations, the above embodiments may include the undertaking only a subset of such features, undertaking a different order of such features, undertaking a different combination of such features, and/or undertaking additional features than those features explicitly listed. The scope of the embodiments should, therefore, be determined with reference to the appended claims, along with the full scope of equivalents to which such claims are entitled.

What is claimed is:

1. A first device comprising:
   an image sensor to:
      generate first raw image data based on image capture of a scene at a first time instance, the first raw image data including Bayer image data;
      generate a plurality of second raw image data instances based on image capture of the scene at a plurality of subsequent second time instances;
   instructions; and
   at least one processor circuit to be programmed based on the instructions to:
      apply a deep learning engine to the Bayer image data included in the first raw image data to generate one or more first machine vision indicators;
      cause transmission of the first raw image data to a second device after the one or more first machine vision indicators indicate a positive machine vision result, the second device to convert the first raw image data to viewable image data;
      apply the deep learning engine to respective Bayer image data included in corresponding ones of the plurality of second raw image data instances to generate corresponding second machine vision indicators;
      cause transmission of ones of the plurality of second raw image data instances corresponding to positive machine vision results; and
      not cause transmission of ones of the plurality of second raw image data instances corresponding to negative machine vision results.

2. The first device of claim 1, wherein the first device includes a housing carrying the image sensor and one or more of the at least one processor circuit, and the housing does not include an image signal processor capable of converting the first raw image data to the viewable image data or an encoder to encode image data.

3. The first device of claim 2, wherein one or more of the at least one processor circuit is implemented on a first monolithic system on a chip.

4. The first device of claim 1, wherein one or more of the at least one processor circuit is to:
   provide at least the Bayer image data included in the first raw image data to an input layer of the deep learning engine; and
   obtain the one or more first machine vision indicators from an output layer of the deep learning engine.

5. The first device of claim 1, wherein the deep learning engine includes a deep learning neural network.

6. A method comprising:
   generating, via an image sensor of a first device, first raw image data based on image capture of a scene at a first time instance, the first raw image data including Bayer image data;
   generating, via the image sensor, a plurality of second raw image data instances at a plurality of subsequent second time instances;
   applying, via at least one processor circuit of the first device programmed based on at least one instruction, a deep learning engine to the Bayer image data included in the first raw image data to generate one or more first machine vision indicators;
   transmitting, from the first device, the first raw image data to a second device after the one or more first machine vision indicators indicate a positive machine vision result, the second device to convert the first raw image data to viewable image data;
   applying, via one or more of the at least one processor circuit, the deep learning engine to respective Bayer image data included in corresponding ones of the plurality of second raw image data instances to generate corresponding second machine vision indicators; and
   transmitting, from the first device, ones of the plurality of second raw image data instances corresponding to positive machine vision results and not transmitting ones of the plurality of second raw image data instances corresponding to negative machine vision results.

7. The method of claim 6, wherein the applying of the deep learning engine to the Bayer image data includes providing at least the Bayer image data included in the first raw image data to an input layer of the deep learning engine, and including obtaining the one or more first machine vision indicators from an output layer of the deep learning engine.

8. The method of claim 6, wherein the deep learning engine includes a deep learning neural network.

9. At least one non-transitory machine readable medium comprising instructions to cause at least one processor circuit of a first device to at least:
   apply a deep learning engine to Bayer image data included in first raw image data to generate one or more first machine vision indicators, the first raw image data corresponds to a scene at a first time instance;
   cause transmission of the first raw image data to a second device after the one or more first machine vision indicators indicate a positive machine vision result, the second device to convert the first raw image data to viewable image data;
   obtain a plurality of second raw image data instances corresponding to the scene at a plurality of subsequent second time instances;
   apply the deep learning engine to respective Bayer image data included in corresponding ones of the plurality of second raw image data instances to generate corresponding second machine vision indicators; and
   cause transmission of ones of the plurality of second raw image data instances corresponding to positive machine vision results and not cause transmission of ones of the plurality of second raw image data instances corresponding to negative machine vision results.

10. The at least one machine readable medium of claim 9, wherein the instructions are to cause one or more of the at least one processor circuit to:
- provide at least the Bayer image data included in the first raw image data to an input layer of the deep learning engine; and
- obtain the one or more first machine vision indicators from an output layer of the deep learning engine.

11. The at least one machine readable medium of claim 9, wherein the deep learning engine includes a deep learning neural network.

\* \* \* \* \*